United States Patent Office 3,546,666
Patented Dec. 8, 1970

3,546,666
METHOD AND APPARATUS FOR DETERMINING THE POSITION OF OBJECTS IN WATER
Günter Hans Ziehm, Kiel, and Karl-Friedrich Triebold, Bremen-Osterholz, Germany, assignors to Fried. Krupp Gesellschaft mit beschrankter Haftung, Essen, Germany
Filed Dec. 5, 1968, Ser. No. 781,429
Claims priority, application Germany, Dec. 5, 1967, 1,623,492
Int. Cl. G01s 3/00, 9/68
U.S. Cl. 340—2
6 Claims

ABSTRACT OF THE DISCLOSURE

Method and apparatus for determining the position of sound-reflecting or radiating objects in water, such as submarines or the like, with the aid of waterborne buoys and an aircraft.

The apparatus employs two sonobuoys spaced apart on the surface of the water which continuously determine the angular horizontal bearings of both the objects in the water and the aircraft with respect to an earth-fixed reference direction such as north. The buoys also continuously transmit this bearing information to the aircraft via radio.

BACKGROUND OF THE INVENTION

The present invention relates to a method and apparatus for locating sound reflecting or radiating objects in water. The method and apparatus is especially suitable for providing direction-finding data for the navigation of aircraft.

Systems for detecting and calculating the position of seagoing objects, such as submarines, are well known in the art. One such system, which is illustrated and described in the U.S. Pat. No. 3,183,478 of Z. I. Slawsky et al., employs a group of sonobuoys comprised of two independent pairs of buoys floating in the water, the individual buoys of each pair being spaced apart a prescribed distance. The location of the sound reflecting object is determined with this system in the following manner: Each pair of sonobuoys measures the horizontal bearing of both the target and the aircraft relative to the line between the individual buoys of each pair. This bearing information is then transmitted to the aircraft and the latter is flown to the point at which the horizontal bearings of the target are identical with the horizontal bearings of the aircraft.

This sonobuoy system has the disadvantage that the location of the target is determined with an ambiguity; that is, that the aircraft may be guided to either one of two possible locations.

Another disadvantage of this prior art system is that the horizontal bearings can not be taken with reference to an earth-stationary reference system.

SUMMARY OF THE INVENTION

An object of the present invention, therefore, is to provide a method and apparatus for locating sound reflecting or radiating objects in water which is not subject to the disadvantages of the prior art system described above.

This object, as well as other objects which will become apparent in the discussion that follows, is achieved, according to the present invention, by providing only two sonobuoys, which can be spaced apart in the water any arbitrary distance, each operative to receive acoustical signals from the sound reflecting or radiating object in the water and receive either electromagnetic or acoustical signals from the aircraft, and to determine and transmit by radio the bearings of the object and of the aircraft with reference to a fixed direction with respect to the earth, such as north. As in the case of the prior art system, the aircraft receives the transmissions and is thus informed of its position relative to the position of the object in water.

DESCRIPTION OF THE PREFERRED EMBODIMENTS

Figure 1:
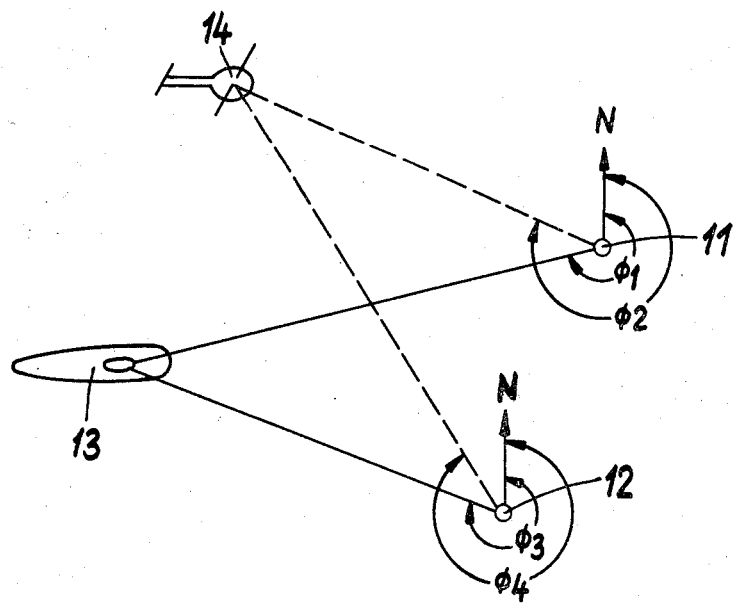
FIG. 1 is a plan view of an airborne aircraft, a sound reflecting or radiating target at least patrially submerged in the sea, and two sonobuoys, illustrating the horizontal bearing geometry employed in the method and apparatus according to the present invention.

Referring now to the drawings, FIG. 1 illustrates the horizontal plane with the various bearing angles utilized in the method and apparatus according to the present invention. As viewed from above, FIG. 1 shows two waterborne sonobuoys 11 and 12 which are used to obtain bearing triangles on both a sound reflecting or radiating target 13 in the water and an aircraft 14. The buoys 11 and 12 transmit the bearing information to the aircraft 14 so that the latter can be navigated to the point at which the two bearing triangles superimpose.

The sonobuoys 11 and 12 are placed in the water from the aircraft, pick up the acoustical signals originating at the object 13 and receive either acoustical or electromagnetic signals radiated by the aircraft 14. The sonobuoys 11 and 12 then determine the horizontal bearing angles $\phi_1$ and $\phi_3$, respectively, between the signals from the object and the direction north and the angles $\phi_2$ and $\phi_4$, respectively, between the signals received from the aircraft and the direction north. This bearing information is finally transmitted to the aircraft 14 and employed by its pilot to maneuver or navigate to a point directly above the object 13. When this occurs the two bearings reported from each buoy 11 and 12 will be equal; that is $\phi_1=\phi_2$ and $\phi_3=\phi_4$.

Figure 2:
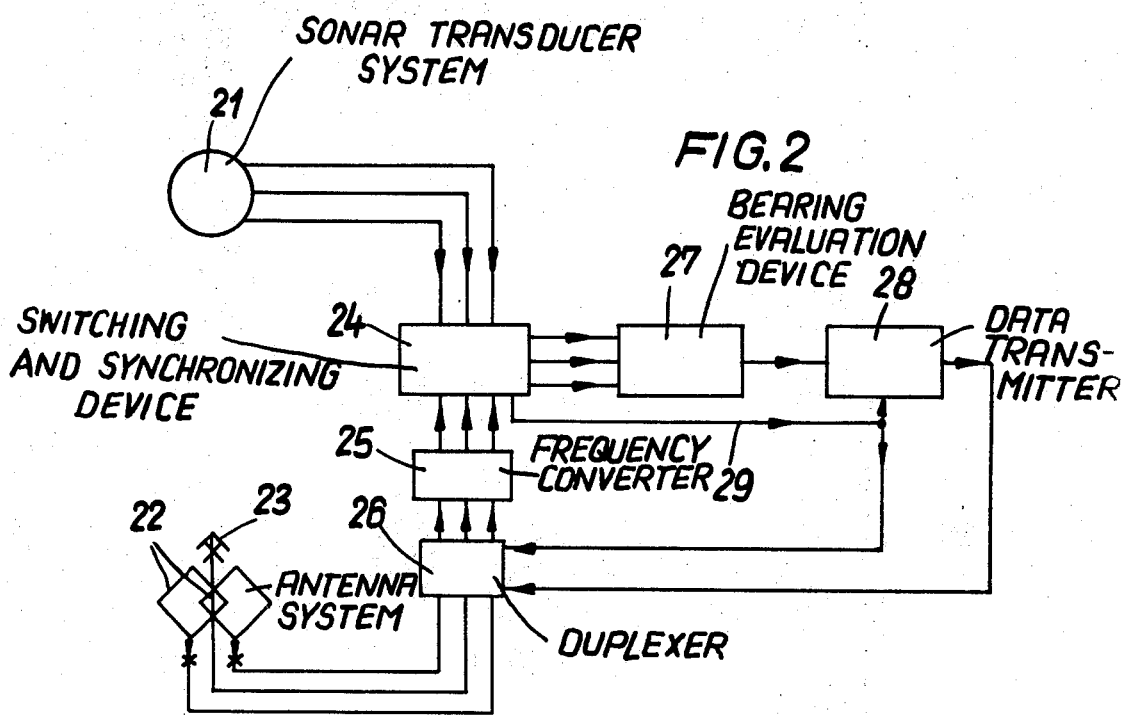
FIG. 2 is a block diagram of the sonobuoy electrical circuitry according to a preferred embodiment of the present invention.

FIG. 2 schematically illustrates a preferred embodiment of the circuit employed in each of the buoys 11 and 12. As FIG. 2 shows, the acoustical signals emanating from the object 13 are received by the acoustic-electric transducer system 21. This system is of the type referred to, for example, in the U.S. Pat. No. 3,290,642 of R. I. Mason et al. The transducer diverts the acoustical signals into three electrical voltages; whereas one of the voltages is independent of the horizontal direction of propagation of the received acoustical signals, the other two voltages have a sine and a cosine dependence upon the horizontal bearing, respectively. Such receiving apparatus is shown and described, for example, in the U.S. Pat. No. 2,965,879 of B. Lippel and the U.S. Pat. No. 3,286,224 of A. H. Zefting. These three voltages are then supplied to a selecting and synchronizing device 24, the functions of which are well known in their art.

The electromagnetic signals from the aircraft 14 are rectived by the crossed-coil antenna 22 and the omni-directional antenna 23 and supplied to the switching and synchronizing device 24 via a duplexer 26 and a frequency converter 25. The two voltages produced by the crossed-coil antenna have a sine and cosine dependence, respectively, upon the horizontal bearing of the aircraft in a manner corresponding to the output voltages of the transducer system 21. The voltage output of the omnidirectional antenna 23 is independent of the horizontal aircraft bearing. For a description of direction-finding antennas and techniques using electromagnetic waves see "Nautische Technik" by Heinz Gabler: Deutsche Hydrographische Zeitschrift, Ergänzungsheft 3 (1955), pp. 78–94.

The frequency converter 25 transforms the frequency of the voltages at its input down to the frequency range of the transducer system 21. The frequency transformation makes it possible to alternately supply the output voltages of the transducer system 21 and the output voltages of the frequency converter 25 to a common bearing evaluation device 27. The alternate switching is accomplished by the switching and synchronizing device 24. The device 27 alternately calculates the horizontal bearings $\phi_1$ and $\phi_2$ for the sonobuoy 11 (or $\phi_3$ and $\phi_4$ for the sonobuoy 12) and feeds these values to the data transmitter 28. This latter device functions to transmit the bearings to the aircraft 14 via the duplexer 26 and the omni-directional antenna 23.

Te data transmitter 28 and the duplexer 26 are switched periodically by a synchronizing signal produced in the switching and synchronizing device 24. The device 24 also functions to add a code via the line 29, to the signals ultimately transmitted with the data transmitter 28 and the omni-directional antenna 23, to indicate whether they relate to the bearing of the aircraft 14 or the bearing of the sound reflecting or radiating object 13.

During the period of transmission, the duplexer disconnects the leads between the crossed-coil antenna 22 and the frequency converter 25 and connects the omni-directional antenna 23 with the data transmitter 28 so that it operates as a transmitting antenna.

The measured values of the bearings transmitted to, and received by, the aircraft 14 may be displayed for the pilot either in analog or, upon suitable conversion, in digital form. Such display techniques are old in the art and are illustrated and described, for example, in the U.S. Pat. No. 3,300,783 of G. Ziehm.

The sonar transducer system 21 and the antenna system 22 and 23 in the apparatus of FIG. 2 are connected rigidly together and to the buoy so that their output voltages will uniquely determine the bearings of the sound reflecting or radiating object 13 and the aircraft 14, with reference to an axis in a single coordinate system. This coordinate system will be in fixed relationship with the buoy, which, however does not remain stationary with respect to the earth. This coordinate system will hereafter be referred to as the "buoy coordinate system."

Since, according to the present invention, the bearings of the object 13 and the aircraft 14 are to be calculated with reference to a direction which is fixed with respect to the earth, it is necessary to make a transformation between the buoy coordinate system and what will hereafter be referred to as the "earth coordinate system"; namely, a coordinate system that is fixed with respect to earth. This problem is solved in the present invention by providing a compass-stabilized coordinate transformation device built into the bearing evaluation device 27, which fixes the earth coordinate system with respect to the earth's magnetic north. This coordinate transformation device, which is shown as elements 31, 32, and 33 in FIG. 3, thus permits the two direction dependent voltages of the acoustic and electromagnetic receiving systems to be transformed from a sine and cosine dependence upon bearings in the buoy coordinate system to a sine and cosine dependence upon bearings with respect to north.

Figure 3:
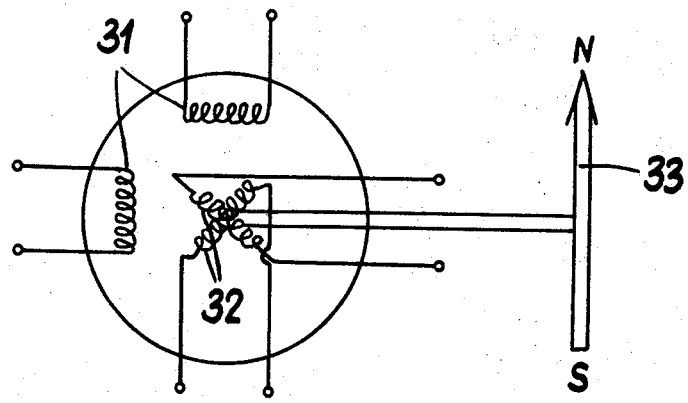
FIG. 3 is a schematic diagram of a compass-stabilized coordinate transformation device according to the present invention suitable for use in the electrical circuitry of FIG. 2.

As FIG. 3 shows, the compass-stabilized coordinate transformation device consists of a stator 31 and a rotor 32, both of which include two perpendicularly arranged windings. The rotor 32 is rotatable about a central axis and mechanically coupled with a compass 33 that determines its angular position. The two windings of the stator 31 are connected to receive the direction dependent voltages supplied by the switching and synchronizing device 24.

As noted above, the amplitude of one of these voltages is dependent upon the sine and the amplitude of the other is dependent upon the cosine of a bearing $\varphi$ with respect to a reference axis in the buoy coordinate system. Since the switching and synchronizing device 24 alternately switches between the voltages received from the sonar transducer system and the antenna system, the bearing $\varphi$ alternately becomes the bearing $\varphi_1$ for the buoy 11 (or the bearing $\varphi_3$ for the buoy 12) of the object 13 and the bearing $\varphi_2$ for the buoy 11 (or the bearing $\varphi_4$ for the buoy 12) of the aircraft 14. The amplitude of the alternating voltages induced in the two windings of the rotor 32 will be so dependent upon the sine and cosine of the angular position of the rotor as to provide the desired transformation. The amplitude of the voltage appearing across the outputs of one of the rotor windings will exhibit a sine dependence upon the bearing $\varphi$ taken with respect to north, while the amplitude of the voltage appearing across the output terminals of the other winding of the rotor will exhibit a cosine dependence upon the bearing $\varphi$ taken with respect to north. These output voltages thus represent the transformed direction-dependent voltages of the receiving systems 21, 22 and 23.

The bearing $\varphi$ with respect to north (of, alternately, the object 13 and the aircraft 14) is then uniquely determined in the usual way with the aid of the two directional dependent voltages, transformed as described above, and the associated third non-directional dependent voltage received alternately from the sonar transducer system and the antenna system. This calculation takes place in the bearing evaluation device 27. This device 27, as well as the switching and synchronizing device 24, the frequency converter 25, the duplexer 26, and data transmitter 28 are all well known in the art and, since they are utilized in their conventional manner, will not be described in detail here.

The particular advantage of the position-finding system according to the present invention is that the usual rotations and displacements of each of the buoys 11 and 12, caused by the wind and the movements of the water, have no influence on the buoy's direction-finding accuracy. Since all the bearings are measured with respect to north—that is, a fixed direction with respect to the earth—the system provides automatic compensation for the rotations of each buoy. Since, further, displacements of the individual buoys change the measured horizontal bearings of the aircraft and the sound reflecting or radiating object 13 by the identical amount in the same direction, these changes will cancel each other out when the two bearings are compared in the aircraft 14.

The system according to the present invention has the additional advantage of providing a bearing on a sound reflecting or radiating object 13 already at the time when the first buoy 11 is dropped from the aircraft into the water. This bearing enables the pilot to determine that course of the aircraft 14, to the point where the second buoy 12 is to be dropped, which will permit the greatest possible accuracy in the determination of the location of the object 13. Such is the case when, at the moment the first buoy 11 is dropped or shortly thereafter, the aircraft 14 is flown in a direction at a horizontal angle of approximately 60° with the line between the dropped buoy and the sound reflecting or radiating object 13.

The present invention is not limited to the embodiments described above but may, for example, determine the horizontal bearing of the aircraft 14 with the aid of acoustic, instead of electromagnetic, waves. These acoustic waves can be specially produced at the aircraft 14 for receipt by the buoys or may simply be the noises generated by the aircraft itself.

Figure 4:
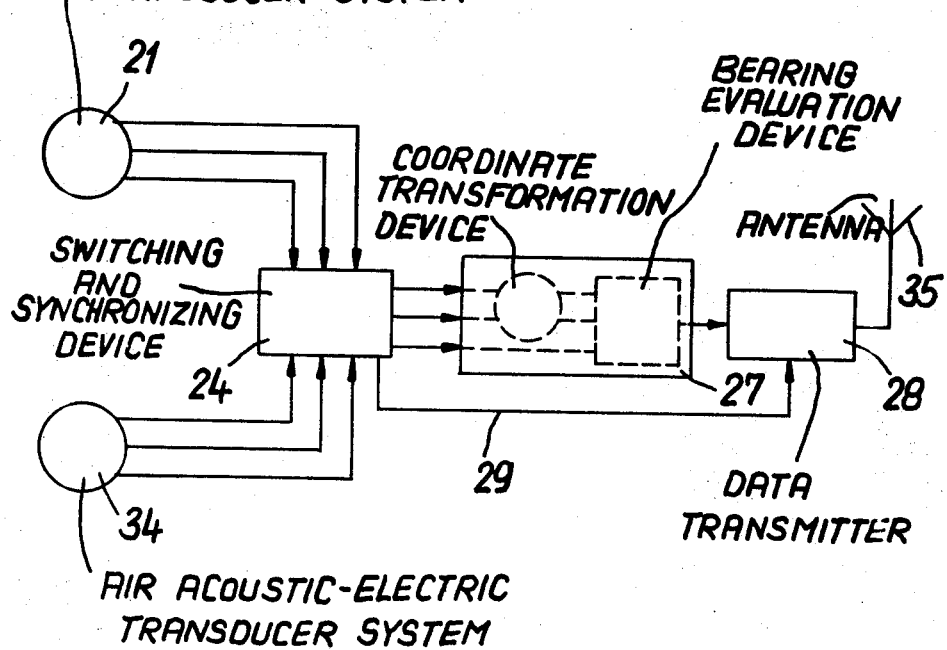
FIG. 4 is a block diagram of the sonobuoy electrical circuitry according to another preferred embodiment of the present invention.

FIG. 4 illustrates the buoy circuitry necessary to implement this embodiment having the cross-coil antenna 22 and the omni-directional antenna 23 of the embodiment of FIG. 2 replaced by an acoustic-electric transducer system 34 suitable for sound waves in air. Such a transducer system is shown and described in U.S. Pat. No. 2,965,879 of B. Lippel. As FIG. 4 shows, the transducer system 34 can be connected directly to the switching and synchronizing device 24 without the use of a duplexer or frequency converter. The data transmitter 28 is provided with a separate transmitting antenna 35.

The system according to the present invention can also be employed to guide or "vector" aircraft, which fly over the ocean, with transponders that are initially placed at known geographical positions in the manner shown and described in "Progress on Mohole" by R. E. Munske; Undersea Technology, December 1963, pp. 16–19 (see, in particular, the figure on p. 17). In this situation a transponder acts as the sound reflecting object 13. The aircraft drops the two sonobuoys according to the invention into the water when passing near the known geographical positions; these sonobuoys then provide the aircraft with the information necessary to determine its exact position.

It will be understood that the above description of the present invention is susceptible to various modifications, changes and adaptions.

What is claimed is:

1. Apparatus for determining the position of an object in water and a tracking aircraft relative to each other, comprising first and second sonobuoys, each buoy including, in combination:
   (a) first means for receiving acoustical signals from the object in the water;
   (b) second means rigidly mechanically connected to said first means for receiving signals from the aircraft;
   (c) means, connected to said first and second means, for determining the horizontal bearings of the object and of the aircraft with reference to a fixed direction with respect to earth, said means including means for determining said fixed direction with respect to earth so that said fixed direction ranging data can be determined with a single buoy; and
   (d) means, connected to said determining means, for transmitting the horizontal bearing information to the aircraft.

2. The apparatus defined in claim 1 wherein said fixed direction is north, and said second receiving means receives acoustical signals from the aircraft and said transmitting means transmits said horizontal bearing information to said aircraft via electromagnetic waves.

3. The apparatus definite in claim 1 wherein said means for determining said fixed direction with respect to earth is a compass, said fixed direction is north, and said compass is connected to a bearing evaluation means, which evaluation means electromechanically converts the ranging data to north-oriented data.

4. The apparatus defined in claim 1 wherein said second receiving means receives electromagnetic signals from the aircraft.

5. The apparatus defined in claim 1 wherein said first and second receiving means each include:
   (1) means for producing a first voltage in response to the received signals having an amplitude which is dependent on the sine of the angle of incidence of the received signals with reference to a fixed direction with respect to the buoy;
   (2) means for producing a second voltage in response to the received signals having an amplitude which is dependent on the cosine of the angle of incidence of the received signals with reference to said fixed direction with respect to the buoy; and
   (3) means for producing a third voltage in response to the received signals having an amplitude which is independent of the angle of incidence of the received signals.

6. The apparatus defined in claim 5 wherein said determining means includes compass-stabilized coordinate transforming means, comprising, in combination:
   (1) stator means having two stator windings, said two stator windings being arranged in perpendicular relationship with each other;
   (2) rotor means having two rotor windings, said two rotor windings being arranged in perpendicular relationship with each other and being rotatable about an axis; and
   (3) compass means, connected to said rotor means, for rotating said two rotor windings about said axis to maintain said rotor windings in a fixed relationship with respect to north,
      one of said stator windings being connectable to receive one of said first and said second voltages and the other of the stator windings being connectable to receive the other of said first and said second voltages, thereby to produce a fourth voltage across one of said rotor windings that is dependent on the sine of the angle of incidence of the received signals with reference to north and to produce a fifth voltage across the other of said rotor windings that is dependent on the cosine of the angle of incidence of the received signals with reference to north.

References Cited

UNITED STATES PATENTS

| | | | |
|---|---|---|---|
| 2,689,083 | 9/1954 | Hammond | 340—2 |
| 3,148,351 | 9/1964 | Bartlett | 340—6X |
| 3,183,478 | 5/1965 | Slawsky et al. | 340—2 |
| 3,227,994 | 1/1966 | McKeown | 340—3 |
| 3,286,224 | 11/1966 | Zefting | 340—6 |

RICHARD A. FARLEY, Primary Examiner

U.S. Cl. X.R.

340—3, 6; 343—6